(12) United States Patent
Hollander et al.

(10) Patent No.: US 10,593,049 B2
(45) Date of Patent: Mar. 17, 2020

(54) SYSTEM AND METHOD FOR REAL-TIME DETECTION OF OBJECTS IN MOTION

(71) Applicant: Chiral Software, Inc., Beverly Hills, CA (US)

(72) Inventors: Eric Jonathan Hollander, Beverly Hills, CA (US); Michael Travis Remington, Seattle, WA (US)

(73) Assignee: Chiral Software, Inc., Beverly Hills, CA (US)

( * ) Notice: Subject to any disclaimer, the term of this patent is extended or adjusted under 35 U.S.C. 154(b) by 164 days.

(21) Appl. No.: 15/992,718

(22) Filed: May 30, 2018

(65) Prior Publication Data

US 2019/0370980 A1  Dec. 5, 2019

(51) Int. Cl.
*G06T 7/246* (2017.01)
*G06K 9/00* (2006.01)

(52) U.S. Cl.
CPC .......... *G06T 7/248* (2017.01); *G06K 9/00718* (2013.01); *G06K 9/00771* (2013.01); *G06T 2207/10016* (2013.01); *G06T 2207/20084* (2013.01); *G06T 2207/30232* (2013.01)

(58) Field of Classification Search
CPC .......... G06T 7/248; G06T 2207/10016; G06T 2207/20084; G06T 2207/30232; G06K 9/00718; G06K 9/00771
See application file for complete search history.

(56) References Cited

U.S. PATENT DOCUMENTS

| | | | | |
|---|---|---|---|---|
| 5,732,146 | A * | 3/1998 | Yamada | G06K 9/00711 348/14.15 |
| 6,493,041 | B1 | 12/2002 | Hanko et al. | |
| 7,064,776 | B2 | 6/2006 | Sumi et al. | |
| 7,660,439 | B1 | 2/2010 | Lu et al. | |
| 8,427,538 | B2 * | 4/2013 | Ahiska | H04N 5/217 348/143 |
| 9,805,567 | B2 | 10/2017 | Borel et al. | |
| 9,811,732 | B2 * | 11/2017 | Sundaresan | G06K 9/00624 |
| 9,886,161 | B2 | 2/2018 | Laska et al. | |
| 10,417,773 | B2 * | 9/2019 | Yano | G06T 7/277 |
| 2013/0114849 | A1 | 5/2013 | Pengelly et al. | |
| 2014/0369596 | A1 * | 12/2014 | Siskind | G06K 9/00751 382/158 |
| 2016/0210513 | A1 | 7/2016 | Wang et al. | |
| 2016/0241776 | A1 * | 8/2016 | Kim | H04N 5/23219 |

(Continued)

*Primary Examiner* — Utpal D Shah
(74) *Attorney, Agent, or Firm* — Young Basile Hanlon & MacFarlane, P.C.

(57) ABSTRACT

A method for performing real-time detection of objects in motion includes receiving an input video stream from a camera, detecting if a motion has occurred in a current frame of the input video stream, providing the current frame for object detection if the motion has been detected therein, detecting a moving object in the current frame, displaying the detected moving object, simultaneously tracking a location of the detected moving object within corresponding frame, while the object detection continues for one or more moving objects, and generating a tracking box and overlaying the tracking box on the detected moving object and then transmitting the video to the display, and continuing the tracking of the detected moving object till the object detection continues for corresponding one or more moving objects.

20 Claims, 7 Drawing Sheets

(56) References Cited

U.S. PATENT DOCUMENTS

| | | |
|---|---|---|
| 2017/0053167 A1 | 2/2017 | Ren et al. |
| 2017/0177947 A1* | 6/2017 | Citerin .................. G06T 7/70 |
| 2019/0096069 A1* | 3/2019 | Qian ..................... G06T 7/74 |
| 2019/0114804 A1* | 4/2019 | Sundaresan ............ G06T 7/74 |
| 2019/0130191 A1* | 5/2019 | Zhou ................ G06K 9/00744 |
| 2019/0197707 A1* | 6/2019 | Trolat ................... G06T 7/292 |
| 2019/0304102 A1* | 10/2019 | Chen .................... G06T 7/74 |

* cited by examiner

SYSTEM AND METHOD FOR REAL-TIME DETECTION OF OBJECTS IN MOTION

FIELD OF THE DISCLOSURE

The present disclosure relates generally to object detection systems, and more particularly to systems and methods for real-time detection of objects in motion.

BACKGROUND

Traditional real-time object detection systems are "always on", meaning they process every frame that is received from a video camera. However, running a real-time object detection model on a live video is computationally expensive and usually requires powerful hardware. Additionally, a traditional real-time object detection system does not display a video frame until it has been processed by the object detection algorithm. In less powerful hardware systems such as small computers that lack Graphic processing units (GPUs), this can result in a delayed output. The GPU is an electronic circuit specialized for parallel image processing and machine learning. Also, for typical surveillance use, most of the computation is wasted effort, because most views do not have objects of interest most of the time.

To address the above-mentioned problems, cloud computing is sometimes used. In a typical cloud based object detection system, the camera, smart phone, and local computer all transmit images to the server for cloud based recognition systems. However, cloud processing is slow and is not practical when real-time analysis is needed. For example, in a typical tactical video security system, real-time video information has to be made available to the end users on their mobile devices with a latency of less than one second. An isolated imaging device, such as a drone system that does not have a robust network connection, or a security camera that is not connected to a high-speed internet connection, may be referred to as edge devices. Non-real-time analysis is acceptable on cloud, but many dynamic, tactical, or security needs must have real-time analysis and require the complete processing to occur on an edge device. The major problem that edge devices have, as opposed to cloud video analysis systems, is that they lack processing power to run complex models (neural networks).

In view of the above, there is a need for an object detection system that ensures that the user always has a live camera view in critical scenarios such as security, and that requires less computation to process in real-time on CPU-limited edge devices. The object detection system must allow for smooth object-detection output on less powerful hardware such as small computers that lack GPUs, so as to save computational resources and electricity costs and therefore achieve longer operating time, especially on battery operated portable devices.

SUMMARY

In an embodiment of the present disclosure, a method for performing real-time detection of objects in motion is provided. The method may include receiving an input video stream from a camera and detecting whether a motion has occurred in a current frame of the input video stream. The method may include providing the current frame for object detection if the motion has been detected therein. The method may include detecting a moving object in the current frame using a machine learning algorithm and displaying the detected moving object on a display device. The method may include simultaneously tracking a location of the detected moving object within corresponding frame, from the latest coordinates of the detected moving object, while the object detection continues for one or more moving objects. The method may include generating a tracking box and overlaying the tracking box on the detected moving object and then transmitting the video to the display device. The method may include continuing the tracking of the detected moving object until the object detection continues for the corresponding one or more moving objects.

In an embodiment of the present disclosure, a system for performing real-time detection of objects in motion is provided. The system may include a video receiver configured to receive an input video stream from a camera and a motion detector configured to detect whether a motion has occurred in a current frame of the input video stream based on pixel values of the current frame and one or more previous frames of the input video stream, and outputs the current frame if the motion has been detected therein. The system may include an object recognizer configured to receive and detect a moving object in the current frame using a machine learning algorithm, and transmit the video to the display device for displaying the detected moving object. The system may include an object tracking module that is configured to receive latest co-ordinates of the detected moving object, simultaneously track a location of the detected moving object within corresponding frame, from the received co-ordinates, while the object detection continues for one or more moving objects, generate a tracking box and overlay the tracking box on the detected moving object, and then transmit the video to the display, and continue the tracking of the detected moving object till the object detection continues for corresponding one or more moving objects.

In an embodiment of the present disclosure, a surveillance camera system is provided. The surveillance camera system may include a camera, a display device, a memory to store one or more instructions, and a processor communicatively coupled to the camera, display, and the memory. The processor is configured to execute the one or more instructions of the memory to receive an input video stream from the camera, detect whether a motion has occurred in a current frame of the input video stream based on pixel values of the current frame and one or more previous frames of the input video stream, provide the current frame for object detection if the motion has been detected therein, detect a moving object in the current frame using a machine learning algorithm, display the detected moving object on the display in a corresponding bounding box, simultaneously track the location of the detected moving object within corresponding frame, while the object detection continues for one or more moving objects, generate a tracking box and overlay the tracking box on the detected moving object and then transmit the video to the display, and continue the tracking of the detected moving object till the object detection continues.

In an embodiment of the present disclosure, a computer programmable product for performing real-time detection of objects in motion is provided. The computer programmable product comprising a set of instructions, the set of instructions when executed by a processor may cause the processor to receive an input video stream from a camera, detect whether a motion has occurred in a current frame of the input video stream based on pixel values of the current frame and one or more previous frames of the input video stream. The set of instructions when executed by the processor may further cause the processor to provide the current frame for object detection if the motion has been detected therein, detect a moving object in the current frame using a machine learning algorithm and transmit the video to the display device, and display the detected moving object on a display device. The set of instructions when executed by the processor may further cause the processor to simultaneously track a location of the detected moving object within corresponding frame, from latest co-ordinates of the detected moving object, while the object detection continues for one or more moving objects, generate a tracking box and overlay the tracking box on the detected moving object and then transmit the video to the display device, and continue the tracking of the detected moving object till the object detection continues for corresponding one or more moving objects.

Various embodiments of the present disclosure perform real-time detection of objects in motion with both motion-triggered detection and interpolation between a tracking algorithm and an object detection algorithm. A threaded motion-triggered machine learning inference for live video with seamless switching to an object-tracking algorithm is provided to reduce computational load and maintain smooth performance.

In the motion-triggered detection, the motion data is used as an interpolation between expensive recognition tasks, thereby reducing the need to run the object recognizer/detector. This is especially beneficial for situations where there is limited CPU or no GPU. The important aspect is not reducing transmission of frames, but rather, reduction of recognizer load, by taking key advantage that the motion detection is "inexpensive", while accurate object detection is "expensive". The object detection runs only on those frames where motion is detected, allowing for better performance on slower hardware. Further, the video output does not lag because the object detection occurs in a separate thread. Thereby, allowing the battery-operated devices to run object detection software to save computational resources, and therefore achieve longer operating time on a single charge, and also allowing for smooth object-detection output on less powerful hardware such as small computers that lack GPUs.

The object tracking is performed in tandem with object detection to alleviate CPU load on the object detection algorithm, and makes object detection faster on portable machines that lack powerful GPU processing units. The combination of use of CPU-intensive object recognition, along with CPU-efficient object tracking, is similar to how human vision works. By executing the camera processing and object recognition in parallel, the system ensures that the user always has a live camera view in certain critical scenarios such as security, even if the machine learning algorithm is slowed by unsatisfactory hardware.

Due to increased efficiency, even in cases where a GPU-enabled computer runs an object detection model on a live security camera, the present disclosure allows the computer to process more simultaneous streams, or to use more complicated models on those streams, thereby saving computational resources and electricity costs on such object-detection system that runs on machine learning.

Various embodiments of the present disclosure find application in edge devices like drones and security cameras, which cannot stream data to a server for processing, does not have a high bandwidth network connection and does not have expensive and specialized GPU based hardware for complex computations, but the user needs to have a live camera view all the time. One of the problems, the disclosure solves for the edge devices is latency (time delay) from object detection, as the proposed system does not provide a delayed stream. The disclosure achieves real-time detection of objects in motion, where single frames are sent to an object recognizer, and if the object recognizer is busy, they are sent to an object tracking algorithm.

BRIEF DESCRIPTION OF DRAWINGS

The following detailed description of the preferred embodiments of the present disclosure will be better understood when read in conjunction with the appended drawings. The present disclosure is illustrated by way of example, and not limited by the accompanying figures, in which like references indicate similar elements.

DETAILED DESCRIPTION

The detailed description of the appended drawings is intended as a description of the currently preferred embodiments of the present disclosure, and is not intended to represent the only form in which the present disclosure may be practiced. It is to be understood that the same or equivalent functions may be accomplished by different embodiments that are intended to be encompassed within the spirit and scope of the present disclosure.

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the figures are illustrated for simplicity and clarity and are not necessarily drawn to scale. For example, the dimensions of some of the elements in the figures may be exaggerated, relative to other elements, in order to improve the understanding of the present disclosure.

There may be additional components described in the foregoing application that are not depicted on one of the described drawings. In the event, such a component is described, but not depicted in a drawing, the absence of such a drawing should not be considered as an omission of such design from the specification.

As required, detailed embodiments of the present disclosure are disclosed herein; however, it is to be understood that the disclosed embodiments are merely exemplary of the disclosure, which can be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Further, the terms and phrases used herein are not intended to be limiting but rather to provide an understandable description of the disclosure.

Figure 1:
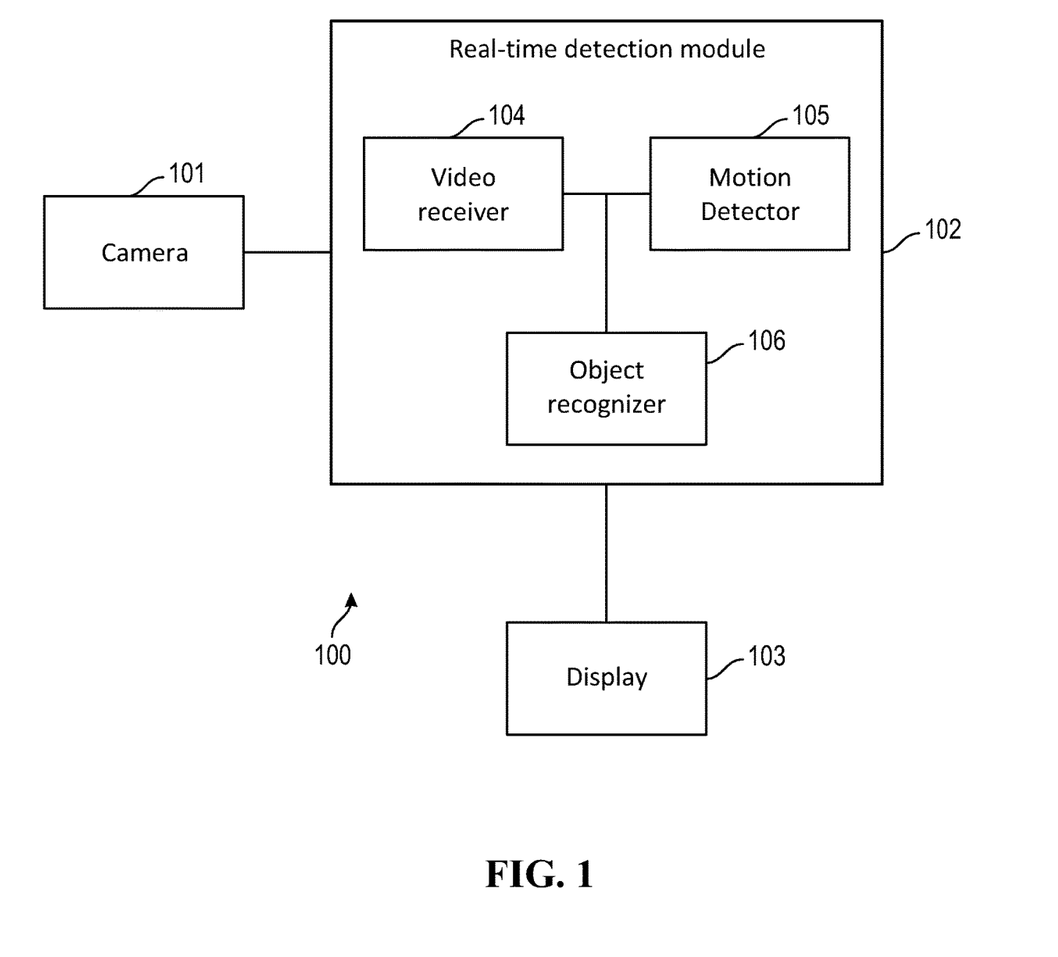
FIG. 1 is a schematic block diagram illustrating a system for real-time detection of objects in motion, in accordance with an embodiment of the present disclosure.

Referring now to FIG. 1, a schematic block diagram of a system 100 for performing real-time detection of objects in motion, in accordance with an embodiment of the present disclosure, is shown. The system 100 includes a camera 101, a real-time detection module 102, and a display 103. The real-time detection module 102 is configured to perform real-time detection of objects captured by the camera 101, and display the detection results on the display 103. Examples of the display 103 include, but are not limited to, an LCD display, an LED display, or the like.

The real-time detection module 102 is connected to the camera 101 either physically through USB, or through a communication network. The communication network may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

Examples of the camera 101 include, but are not limited to a remote battery-powered surveillance camera, a home security camera with a remote control via a home computer or a phone application, a traffic camera, a home doorbell camera, a body camera for soldiers or law enforcement, and a camera on an unmanned aerial vehicle (UAV).

In an embodiment, the camera 101, the real-time detection module 102, and the display 103 may be integrated in a single device, where the single device is a portable smartphone having a built-in camera and a display.

In another embodiment, the camera 101 and the display 103 may be external to the real-time detection module 102 and coupled there to through the communication network, where the real-time detection module 102 is a custom Graphic processing unit (GPU) server software to provide real-time object detection for all cameras on a local network.

In yet another embodiment, the camera 101 may be an IP camera external to the real-time detection module 102 and the display 103, and coupled thereto through the communication network.

In yet another embodiment, the real-time detection module 102 is a processing device that does not include a GPU, and includes limited CPU capabilities to run real-time object detection process. Such real-time detection module 102 may be either integrated with the camera 101 and the display 103 in a single device, or locally connected to the camera 101 and the display 103. The camera 101 can be known as an edge device, as any portable device with a CPU can be referred to as an edge device.

The real-time detection module 102 includes a video receiver 104 configured to receive streams of video input from the camera 101, a motion detector 105 configured to analyze two or more video frames of the video input in sequence to detect if motion has occurred in the consecutive frames, and an object recognizer 106 configured to detect one or more objects in the video frames.

In one embodiment, each of the three components 104-106 could exist on a single physical computer, or on more than one computer and communicate through messaging protocols. If the three components run on a single computer, they could run in separate processes which communicate by communication protocols. If they run within a single process, they might run as threads. If running in a single process, they could also use a reactive design, enabling the components to share one or more threads. The components 104-106 are implemented in a programming language. In an example, the initial implementation of the real-time detection module 102 is written in python code.

In operation, the video receiver 104 receives one or more video frames (hereinafter also referred to as frames) from the camera 101 and provides the same to the motion detector 105. At the motion detector 105, each frame is blurred to remove noise that can trigger false motion detection. The blurred frame is then converted to black and white.

The motion detector 105 uses the open-source OpenCV library for operations such as counting pixel differences and blurring images. The pixel differences between the last three frames are computed and are run through a bitwise AND function. The motion detector 105 returns an error at the display 103 if a frame was not able to be read from a video stream, as moving forward with a corrupted or absent frame may cause further errors.

In an example, the three frames may be denoted as F1, F2, and F3, where F1 is the most recent frame and F3 is the oldest frame. For each iteration of the main loop:
1. A frame is read from the camera 101.
2. The frame is blurred and set to greyscale to remove noise that can trigger motion detection.
3. F1 is set to F2
4. F2 is set to F3
5. F3 is set to the new frame The motion detector 105 keeps a sliding window of the last three frames. Motion detection works as follows:
difference_1=The per-element absolute difference between F3 and F2
difference_2=The per-element absolute difference between F2 and F1
total_difference=Bitwise AND operation of difference_1 and difference_2

This value total_difference is divided by the resolution of the frame to convert it to a ratio of differing pixels in the frame. The total_difference value is then converted to a ratio of the image size.

In one embodiment of the present disclosure, if the ratio of the image size is greater than a user-defined motion threshold, then it means that a motion has been detected in the frame. In such case, the frame is delivered to the object recognizer 106 for real-time detection of object(s) in the frame. Alternatively, the frame is cropped and only the moving part of the frame is delivered to the object recognizer 106, so it has fewer pixels to process. This is an even smaller input to the object recognizer 106, saving further computational resources. Thus, rather than an "always-on" detection, the video frames are processed by the object recognizer 106 when a motion is detected in the frames.

In another embodiment of the present disclosure, if the ratio of the image size is less than the user-defined motion threshold, then it means a motion has not been detected in the frame. In such case, the frame is displayed on the display 103, and an inference thread is not spawned.

In another embodiment of the present disclosure, a more advanced optical flow motion detection algorithm may be used. One particularly good choice is use of a Convolutional neural network (CNN) which accepts two or more frames (T0, T1, T2 . . . ) as input and performs a CNN computation on the inputs to determine objects in motion. The CNN identifies features, such as corners, which are in common between the two or more frames, and determines which of these features have moved. The location of the moved features creates the detection of a moving object. Such a CNN approach performs more accurate detection of boundaries of motion as well resistance to effects such as sensor movement and scene lighting, and is also able to embody understanding of real world scenes in understanding motion. The more advanced optical flow analyzer is significantly better than the primitive pixel delta motion detection approach. While a CNN-based optical flow (motion) detector takes more CPU, it will result in more accurate determinations of motion, which will save more effort on the part of the more "expensive" recognizer.

Thus, when there is no significant movement in a current frame, it is not sent to the object recognizer 106 for processing. Also, only the moving region may be sent to the object recognizer 106 for processing. By reducing the frequency of the most computationally expensive step, i.e. object recognition, and also reducing the number of pixels seen by the object recognizer 106, the real-time detection module 102 runs efficiently and with a fraction of the power and hardware requirements of an "always on" system. There are additional benefits. By only looking at regions which are moving, false positives may be reduced, and that allows to lower detection thresholds, which also can reduce false negatives.

The object recognizer 106 is a machine learning model related to computer vision and image processing that deals with detecting instances of semantic objects of a certain class (such as humans, buildings, or cars) in digital images and videos, and is much more complex than the motion detector 105. This type of machine learning algorithm is a CNN, and uses an advanced real-time variant of open-source object detection algorithm. In an embodiment, there is a shared data structure between the object recognizer 106 and the motion detector 105. If the motion is detected, the motion detector 105 may transmit the video frame to the object recognizer 106, and then check the data structure for results.

Within the object recognizer 106, each received frame is processed and a list of detected objects is created. This list includes confidence values and locations, which could be bounding box coordinates or more precise location information of each detected object. The object recognizer 106 generates a label (identification) and coordinates of any detected object's locations. The returned coordinates are used to draw bounding boxes around each detected object. As the object recognizer 106 makes its detections, the detection results are sent to other components for further processing, storage, or such as the user interface for display. The coordinates and label may be transmitted as a message embedded in corresponding video frame, or as a separate message along with corresponding video frame. The coordinates and label may be displayed on live video streams, or may be stored with corresponding frame, or used for transmitting alerts, or other purposes. A text label may also be displayed next to each object's location.

When the object recognizer 106 does not receive further frames, it enters into an idle mode or terminates, so as to not consume processor resources further. The video receiver 104 may continue to transmit original frames on to other components for display or storage.

Figure 2:
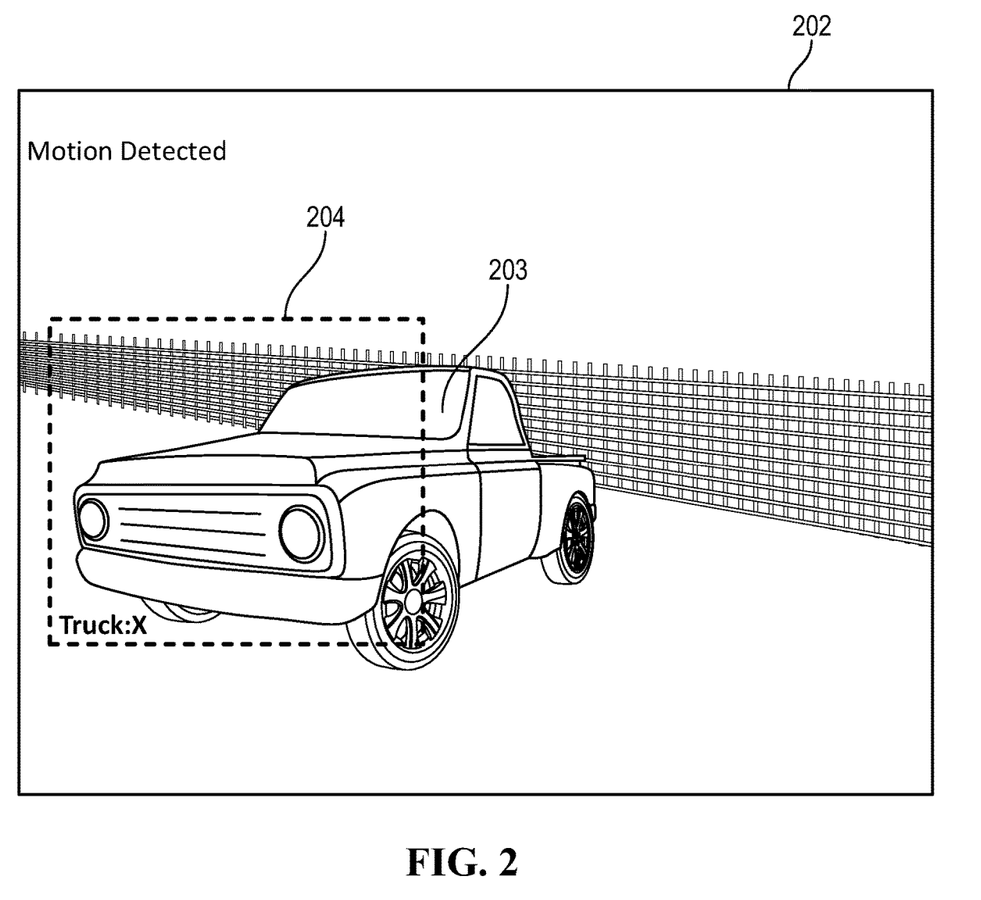
FIG. 2 illustrates exemplary video frames that are detected and tracked in real-time using the system of FIG. 1, in accordance with an embodiment of the present disclosure.

FIG. 2 illustrates an exemplary frame 202 displayed on the display 103, after the frame 202 is being processed by the real-time detection module 102. The object recognizer 106 recognizes the object such as the vehicle 203 and determines its co-ordinates in the frame 202. These co-ordinates are then used to draw a bounding box 204 around the detected object 203. Thus, the bounding box 204 illustrates the detected object 203 to the user.

In the video frame 202, the detected object 203 is a truck, and the object recognizer 106 returns a label, a confidence value, and bounding box coordinates of the truck. The confidence value is between 0.0 and 1.0. The confidence value represents how confident the object recognizer 106 is in the predicted label. For example, if the object recognizer 106 returns "Truck: X", then the recognizer 106 predicts that there is a truck in the frame 202 with a probability of 100X %. For example, if X is equal to 0.95, then the object recognizer 106 is 95% confident that there is a truck in that location.

Referring back to FIG. 1, the object recognizer 106 may include a plurality of object recognition models, and by considering moving objects or regions, one can also dynamically switch object recognition models. For example, a fast moving object might be suited to one model, and a slow moving object to another. Also, objects in one region (for example, a roadway) could be analyzed using one recognition model, while objects in another region (sky or sidewalk) could be analyzed with a different recognition model. Also, if there is one object moving, a complex model could be applied, while if there are more objects, a simpler model could be used to speed up processing of all the models. In particular, when running object recognition models on CPU machines (non-GPU), one may switch to reactive (rather than threaded) programming models for object recognizers, and these can be switched without the latency of starting or stopping threads.

In an embodiment of the present disclosure, an object recognition model may be determined for a video frame depending on the coordinates of the detected motion. When the motion is detected, the region of the movement can also be detected. For example, with a stationary camera, it may be known where the horizon is in the frame. The frames may be sent with the motion detected in the sky to a faster but less accurate detector than frames with motion detected elsewhere, because the objects in the sky are expected to be moving faster.

In an example, the motion detector 105 may receive the video frames at a rate of 30 frame per second (FPS) from the camera 101, but it may provide only 1 frame per second to the object recognizer 106. This holds true if only one frame per second contains motion. The motion detector 105 is capable of providing the frames at the frame rate as the camera (30 FPS in this example). Also, the object recognizer 106 (without specialized high-power GPU hardware and without cloud) may have the capability of processing only 1 frame per second. Thus, the end user may see the real-time detection of the objects in motion on the display 103. If the number of frames per second fed to the object recognizer 106 becomes more than one, then there may be a backlog at the object recognizer 106, and the user may not see the real-time detection of the objects in motion. Thus, the video output frame rate from the camera 101 is decoupled from the frame processing rate of the object recognizer 106, thereby facilitating constant real-time video monitoring, even if the object recognizer 106 cannot process 30 frames per second in real-time due to hardware restrictions.

Figure 3:
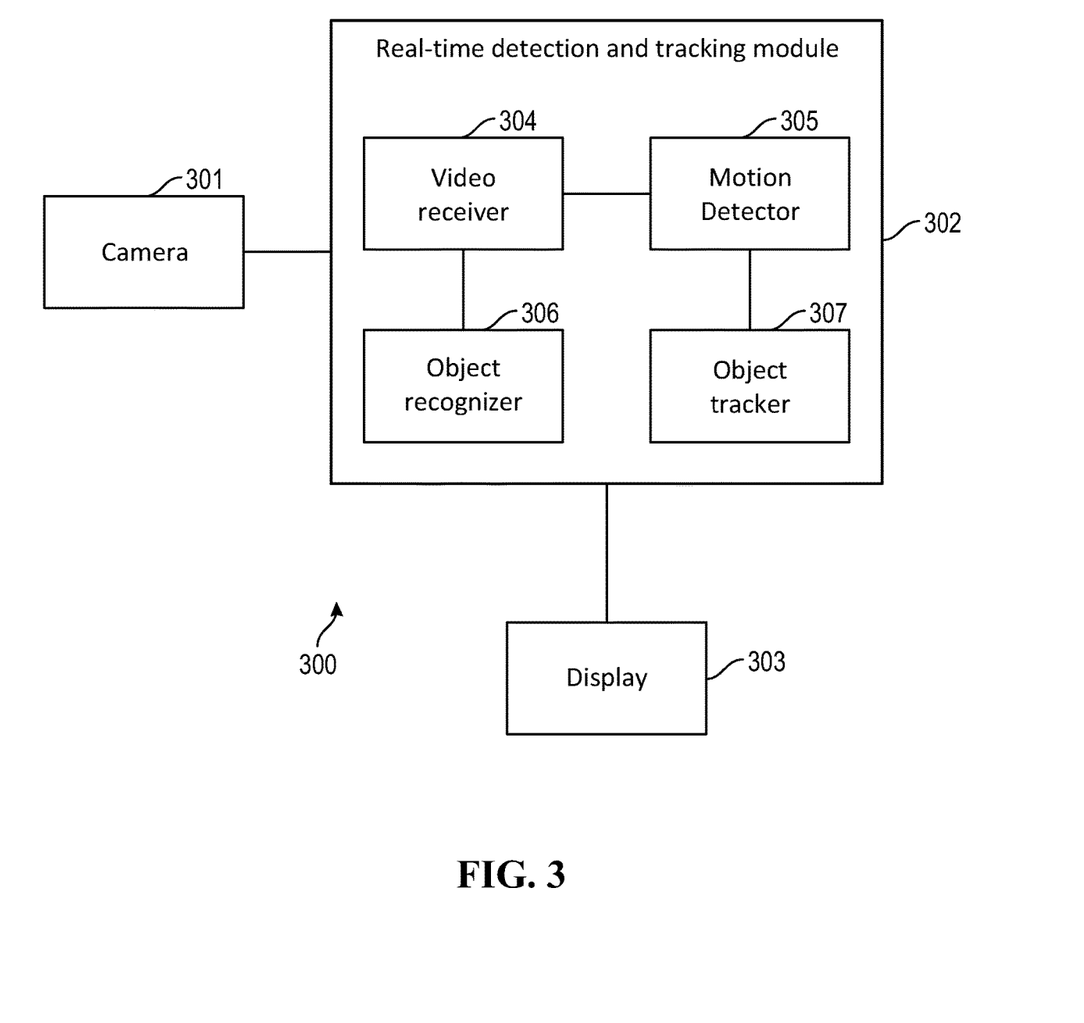
FIG. 3 is a block diagram illustrating a system for real-time time detection and tracking of objects in motion, in accordance with an embodiment of the present disclosure.

FIG. 3 is a schematic block diagram illustrating a system 300 for performing real-time object detection and tracking of objects in motion, in accordance with an embodiment of the present disclosure. The system 300 includes a camera 301, a real-time detection and tracking module 302, and a display 303. The real-time detection and tracking module 302 is configured to perform real-time detection and tracking of objects captured by the camera 301, and display the detection results on the display 303. The camera 301 and the display 303 are similar to the camera 101 and the display 103, and need not be explained again herein for the sake of brevity.

In an embodiment, the camera 301, the real-time detection and tracking module 302, and the display 303 may be integrated in a single device, where the single device is a portable smartphone having a built-in camera and a display. In another embodiment, the camera 301 and the display 303 may be external to the real-time detection and tracking module 302 and coupled thereto through the communication network, where the real-time detection and tracking module 302 is a custom GPU server software to provide real-time object detection for all cameras on a local network. In yet another embodiment, the camera 301 may be an IP camera external to the real-time detection and tracking module 302 and the display 303. In yet another embodiment, the real-time detection and tracking module 302 is a processing device that does not include a GPU, and includes limited CPU capabilities to run real-time object detection process. Such real-time detection and tracking module 302 may be either integrated with the camera 301 and the display 303 in a single device, or locally connected to the camera 301 and the display 303.

The real-time detection and tracking module 302 includes a video receiver 304 configured to receive streams of video input from the camera 301, a motion detector 305 configured to analyze two or more video frames of the video input in sequence to detect if motion has occurred in the consecutive frames, an object recognizer 306 configured to detect one or more objects in the video frames, and an object tracker 307 configured to track objects detected by the object recognizer 306. The video receiver 304, the motion detector 305, the object recognizer 306 are similar to the video receiver 104, the motion detector 105, and the object recognizer 106, and need not be explained herein again in detail for the sake of brevity.

In one embodiment, each of the four components 304-307 could exist on a single physical computer, or on more than one computer and communicate through messaging protocols. If the four components run on a single computer, they could run in separate processes which communicate by communication protocols. If they run within a single process, they might run as threads. If running in a single process, they could also use a reactive design, enabling the components to share one or more threads.

In an embodiment of the present disclosure, the object tracker 307 is configured to take the last coordinates output of a detected object from the object recognizer 306 and continue to track the object's location in real-time, while the object recognizer 306 processes the data. The object tracker 307 does not identify objects, but locates and tracks objects in real-time that have been recognized by the object recognizer 306. The object tracker 307 locates and tracks already detected objects, while the object recognizer 306 is occupied with further detection of moving objects and their location in the frame.

There is a shared data structure between the object recognizer 306 and the motion detector 305. If motion is detected, the motion detector 305 transmits the video frame to the object recognizer 306 and then checks the data structure for results. If the results have not come in yet, the object tracker 307 is activated with the last known object coordinates. When the object recognizer 306 delivers results, they are displayed on the display 303 and the object tracker 307 resets to these updated coordinates. The alternative approach is based on reactive design, sometimes referred to as functional programming, which does not use threads in background processing.

While the object recognizer 306 runs in the background, the object tracking algorithm keep the bounding boxes updated and accurate in parallel. The object tracker 307 is instantiated with object coordinates from the object recognizer 306 and thus lightens the load on the object recognizer 306. This allows for more accurate bounding box updates on less powerful hardware. Since the object tracking algorithm is able to run in real-time with much less computational requirements than the object recognizer 306, it can "fill in the gaps" while the object recognizer 306 is processing a frame. This leads to seamless switching between the object recognizer and object tracking algorithms and a steady updating of object locations to maintain smooth output. While the object recognition algorithm is computing, the faster one (object tracking algorithm) may take over temporarily. The faster algorithm (object tracking algorithm) may receive the last bounding box coordinates from the object recognition algorithm and continue tracking from those coordinates.

An efficient object tracker 307 can be more CPU efficient than an object recognizer 306. Therefore, by using an object tracker 307 and an object recognizer 306 together, the slower object recognizer 306 can be let to work only on a sub-sampling of frames, while the object tracker 307 keeps a track of the identified object. The motion data is being used as interpolation between expensive recognition tasks, thereby reducing the need to run the recognizer 306. This approach is the key to getting the most accurate results on low-power CPUs, therefore enabling accurate recognition on edge devices.

In an embodiment, on the fast hardware, only the object recognition algorithm is needed, but on slower hardware, the system may seamlessly switch to the object tracking algorithm while the object recognition algorithm is processing a frame. This achieves a smoother output of object bounding boxes and detections. The object tracking algorithm can fill-in for the object recognition algorithm if it is running slower than real-time. This switch is automatic and seamless.

Once the object recognizer 306 finishes processing frames, the object tracker 307 may pause for the display of the results of the object recognizer 306 on the display 303. Thus, the object tracker 307 runs the object tracking algorithm only while the object recognition algorithm is processing.

In an example, the object recognizer 306 may take 1 second to process a frame, resulting in a backlog of 30 frames if the camera 301 runs at 30 frames per second. While the object recognizer 306 is processing, the object tracker 307 may process the backlog of frames to ensure smooth output. This improves performance on portable hardware that is without specialized high-power GPU hardware and without cloud.

Figure 4A:
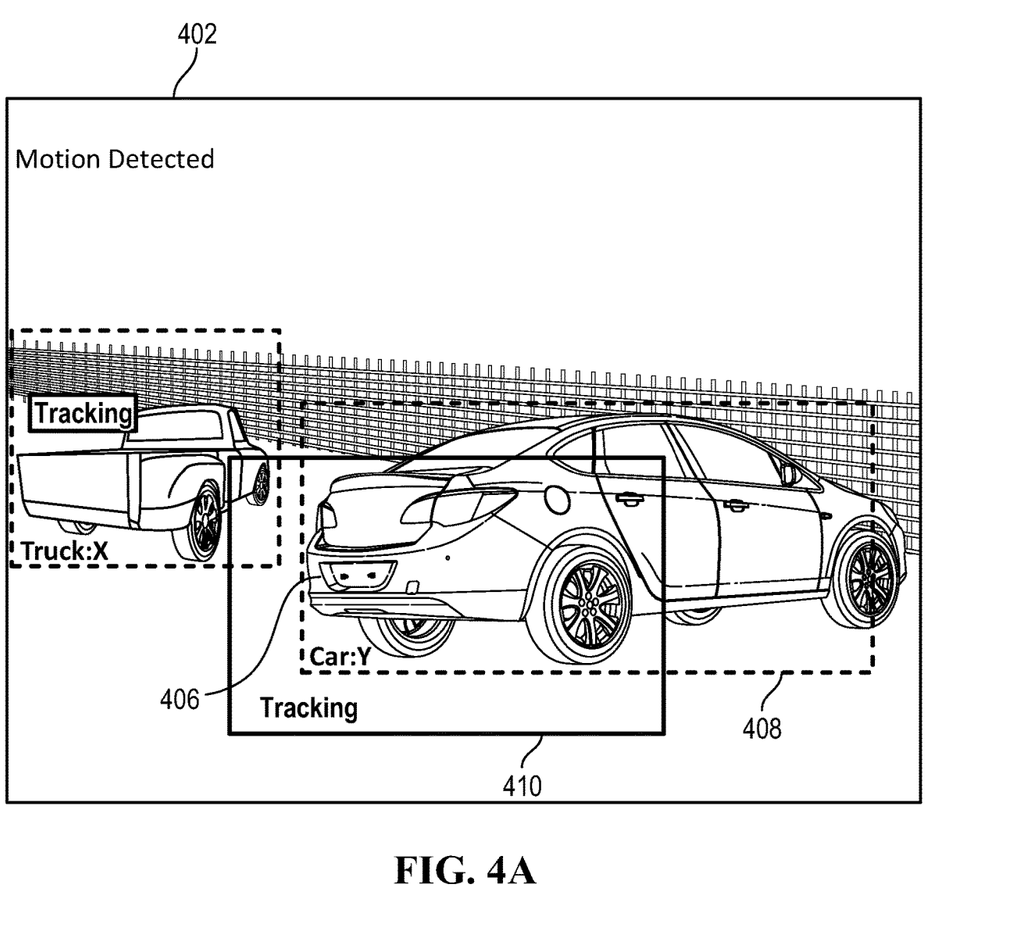
FIGS. 4A and 4B illustrate video frames that are detected and tracked in real-time using the system of FIG. 3, in accordance with an embodiment of the present disclosure.
Figure 4B:
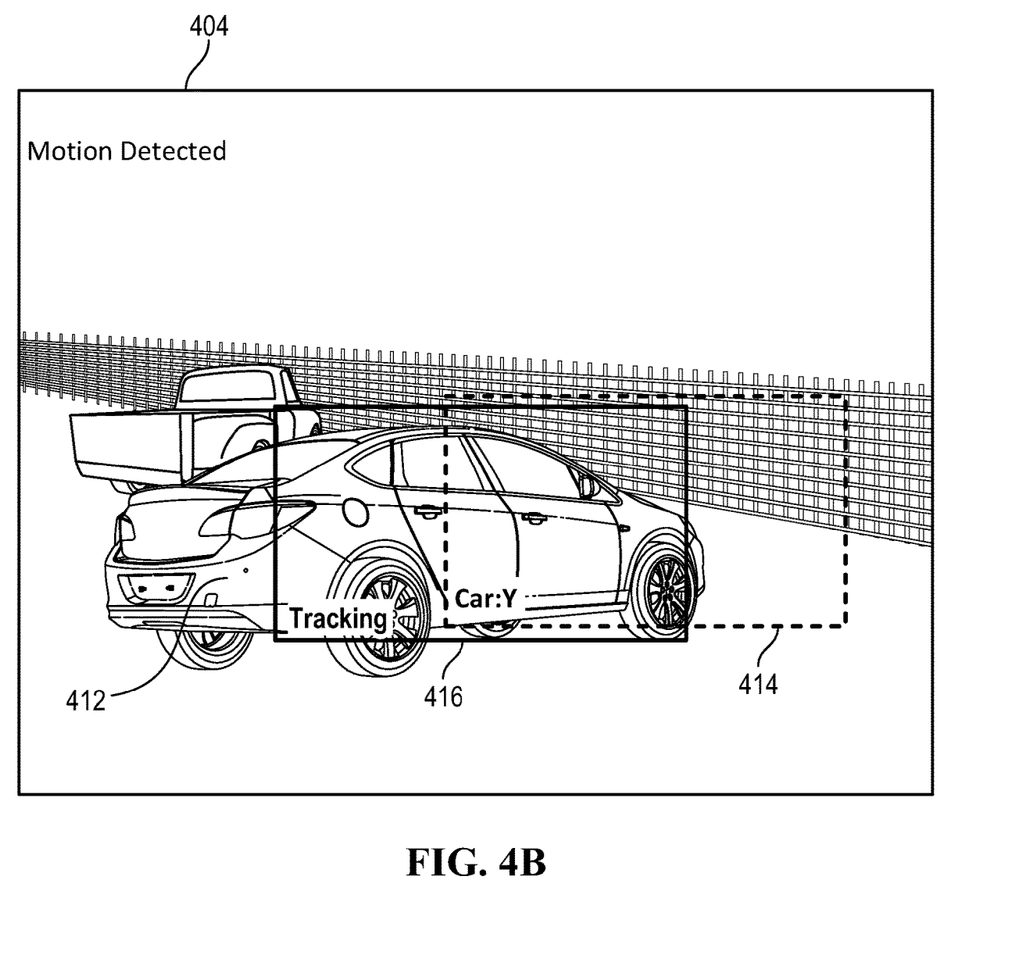

FIGS. 4A and 4B illustrate first and second exemplary frames 402 and 404 respectively processed by the real-time detection and tracking module 302 of FIG. 3 at two different time instants. In the first frame 402, the object recognizer 306 of FIG. 3 recognizes the vehicle 406 and draws a bounding box 408 around the vehicle 406. Based on the last updated coordinates of the bounding box 408, the object tracker 307 of FIG. 3 tracks the vehicle 406 using a tracking box 410. In an embodiment, the tracking box 410 updates faster than the bounding box 408. For example, the bounding box 408 may update at every 1 second, whereas, the tracking box 410 may update 15 times per second.

Similarly, in the second frame 404, the object recognizer 306 recognizes the vehicle 412 and draws a bounding box 414 around the vehicle 412. Based on the last updated coordinates of the bounding box 414, the object tracker 307 may track the vehicle 412 using a tracking box 416.

Further, in FIG. 4A, the object recognizer 306 returns labels, confidence values, and bounding box coordinates of one or more detected objects. For example, if in the video frame 402, the object recognizer 306 returns "Car: Y" and "Truck: X", then the object recognizer 306 predicts that there are car and trucks in the frame with probabilities of 100Y % and 100X % respectively. For example, if X is equal to 0.95 and Y is equal to 0.91, then the object recognizer 306 is 95% confident that there is a truck in that location and is 91% confident that there is a car in that location.

Furthermore, in FIG. 4B, the object recognizer 306 returns labels, confidence value, and bounding box coordinates of the detected object. For example, if in the video frame 404, the object recognizer 306 returns "Car: Y", then the object recognizer 306 predicts that there is a car in the frame 404 with probability of 100Y %. For example, if Y is equal to 0.96, then the object recognizer 306 is 96% confident that there is a car in that location.

Applications of the Present Disclosure:

A government or corporate facility may install the system of the present disclosure with edge processing. In one example, an attacker may approach the facility with a weapon. The system, in real-time, is configured to identify a visible weapon (a rifle etc.) and alert security. The security team may use their smartphones to obtain real-time views from the security cameras. Due to the real-time edge processing, the application shows the responders only the relevant images to see, out of the hundreds of cameras that may be in the building.

A UAV may install the system of the present disclosure to detect objects that come in its way in real-time and make navigation decisions in real-time based on detected objects.

Figure 5:
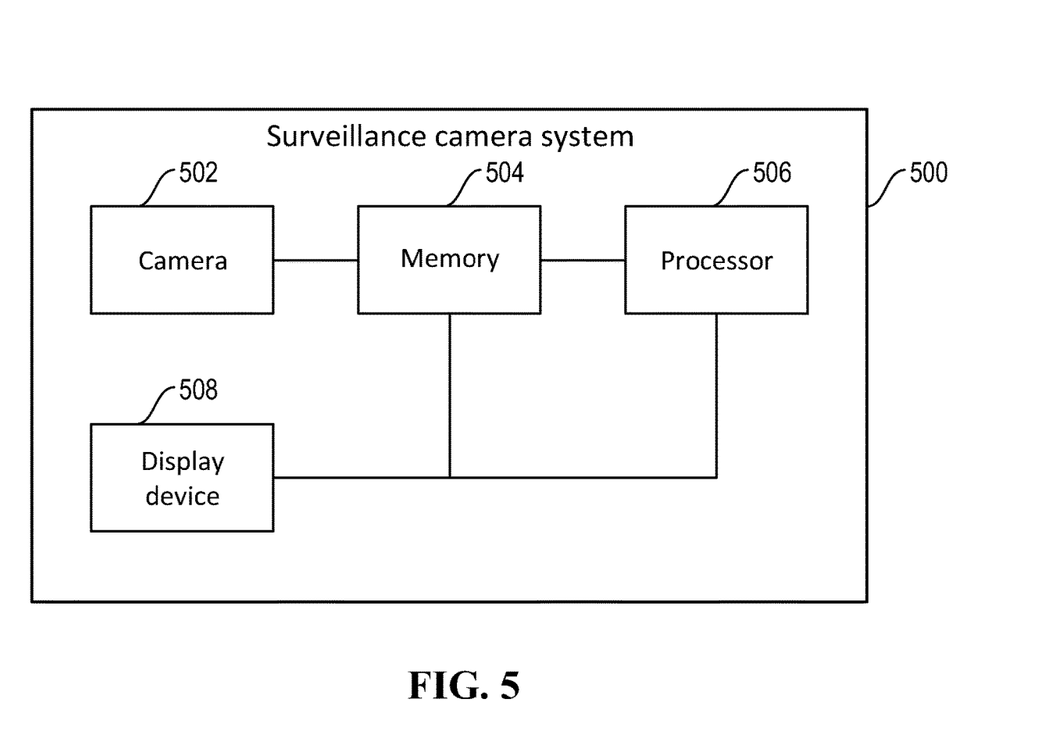
FIG. 5 is a schematic block diagram illustrating a surveillance camera system for performing real-time object detection and tracking of objects in motion, in accordance with an embodiment of the present disclosure.

FIG. 5 is a schematic block diagram illustrating a surveillance camera system 500 for performing real-time object detection and tracking of objects in motion, in accordance with an embodiment of the present disclosure.

The surveillance camera system 500 includes a camera 502, a memory 504, a processor 506, and a display device 508. The processor 506 is communicatively coupled to the camera 502, the memory 504, the display device 508.

In an embodiment, the processor 506 is configured to execute the one or more instructions of the memory 504 to receive an input video stream from the camera 502, detect if a motion has occurred in a current frame of the input video stream based on pixel values of the current frame and one or more previous frames of the input video stream. The processor 506 is further configured to receive an input video stream from the camera 502 to provide the current frame for object detection if the motion has been detected therein, detect a moving object in the current frame using a machine learning algorithm, and transmit the detected moving object to the display device for display in a corresponding bounding box. The processor 506 is further configured to simultaneously track the location of the detected moving object within corresponding frame, while the object detection continues for one or more moving objects, generate a tracking box and overlay the tracking box on the detected moving object and then transmit the video to the display, and continue the tracking of the detected moving object till the object detection continues.

Figure 6:
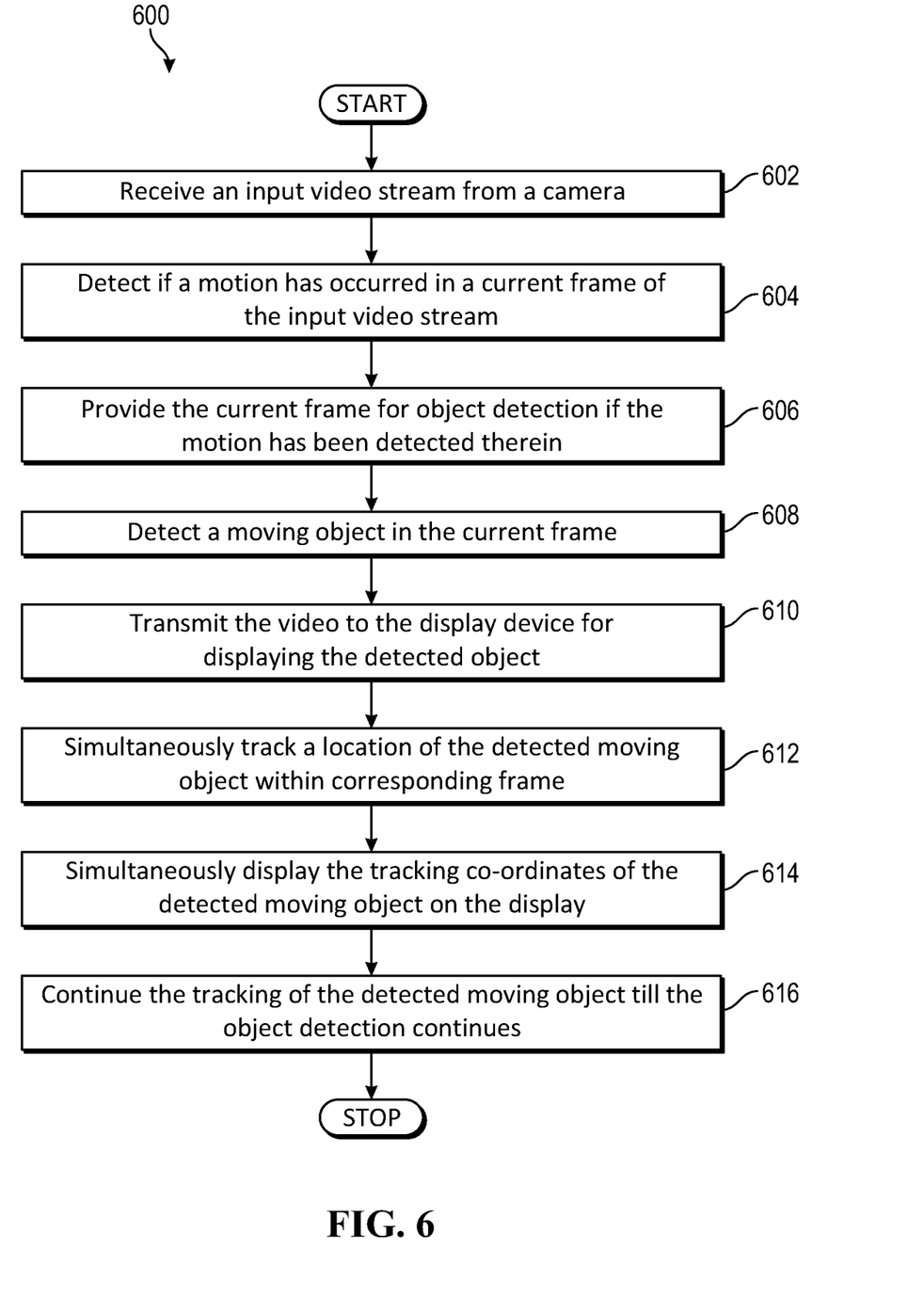
FIG. 6 is a flow chart to illustrate a method for real-time time detection and tracking of objects in motion, in accordance with an embodiment of the present disclosure.

FIG. 6 is a method flowchart for real-time detection of objects in motion, in accordance with an embodiment of the present disclosure. Some steps may be discussed with respect to the system as shown in FIG. 1.

At step 602, an input video stream is received from a camera. In an embodiment, a video receiver receives one or more video frames (hereinafter also referred to as frames) from the camera and provides the same to a motion detector. At the motion detector, each frame is blurred to remove noise that can trigger false motion detection. The blurred frame is then converted to black and white.

At step 604, it is detected if a motion has occurred in a current frame of the input video stream based on pixel values of the current frame and one or more previous frames of the input video stream. In an embodiment, the motion detection is performed using a Convolutional Neural Network (CNN) which accepts two or more frames (T0, T1, T2 . . . ) as input and performs a CNN computation on the inputs to determine objects in motion. The CNN identifies features, such as corners, which are in common between the two or more frames, and determines which of these features have moved. The location of the moved features creates the detection of a moving object.

At step 606, the current frame is provided for object detection if the motion has been detected therein. Thus, only the moving region may be sent for object recognition for processing. By reducing the frequency of the most computationally expensive step, i.e. object recognition, and also reducing the number of pixels seen by the object recognizer, the real-time detection runs efficiently and with a fraction of the power and hardware requirements of an "always on" system.

At step 608, a moving object is detected in the current frame using a machine learning algorithm. The machine learning algorithm is related to computer vision and image processing that deals with detecting instances of semantic objects of a certain class (such as humans, buildings, or cars) in digital images and videos, and is much more complex than the motion detector. This type of machine learning algorithm is a CNN, and uses an advanced real-time variant of open-source object detection algorithm.

At step 610, the video is transmitted to the display device for displaying the detected moving object in a corresponding bounding box. In an embodiment, the co-ordinates (location) and label (identification) may be displayed on live video streams, or may be stored with corresponding frame, or used for transmitting alerts, or other purposes.

At step 612, a location of the detected moving object is simultaneously tracked within corresponding frame, from the received co-ordinates, while the object detection continues for one or more moving objects. In an embodiment of the present disclosure, the object tracking is performed by taking the last coordinates output of a detected object and continuing to track the object's location in real-time, while the object recognition takes place in background.

At step 614, a tracking box is generated and the tracking box is overlayed on the detected moving object and then the video is transmitted to the display device. In an embodiment, the tracking box and the bounding box of the detected moving object are simultaneously displayed on the display, where the tracking box updates faster than the bounding box.

At step 616, the tracking of the detected moving object is continued till the object detection continues for corresponding one or more moving objects. While the object detection runs in the background, the object tracking keeps the bounding boxes of one or more detected objects updated and accurate in parallel.

The present disclosure may be implemented in the form of a computer programmable product for performing real-time detection of objects in motion. The computer programmable product includes a set of instructions, the set of instructions when executed by a processor causes the processor to perform the methods as discussed with FIG. 6.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor and a memory may be used to implement the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without deviating from the scope of present disclosure.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure, as described in the claims.

The invention claimed is:

1. A method for performing real-time detection of objects in motion, the method comprising:
   receiving an input video stream from a camera;
   detecting if a motion has occurred in a current frame of the input video stream based on pixel values of the current frame and one or more previous frames of the input video stream;
   providing the current frame for object detection if the motion has been detected therein;
   detecting a moving object in the current frame using a machine learning algorithm;
   transmit the video to the display device for displaying the detected moving object;
   simultaneously tracking a location of the detected moving object within corresponding frame from the latest co-ordinates of the detected moving object, while object recognition continues to recognize one or more of the detected moving objects;
   generating a tracking box and overlaying the tracking box on the detected moving object and then transmitting the video to the display device; and
   continuing the tracking of the detected moving object till the object recognition continues for corresponding one or more of the detected moving objects.

2. The method of claim 1 further comprising providing only a moving region of the current frame for object detection when the motion has been detected in the current frame.

3. The method of claim 1 further comprising displaying the detected moving object on the display device in a corresponding bounding box.

4. The method of claim 1, wherein the detecting if the motion has occurred in the current frame comprises using an advanced Convolutional Neural Network (CNN)-based optical flow detector as an input filter, wherein the CNN identifies features, such as corners, which are in common between the two or more frames, and determines which of these features have moved to detect motion.

5. The method of claim 1, wherein the location of the detected moving object is simultaneously tracked within corresponding frame when the object detection of one or more moving objects does not happen in real-time.

6. A system for performing real-time detection of objects in motion, the system comprising:
   a video receiver configured to receive an input video stream from a camera;
   a motion detector configured to detect if a motion has occurred in a current frame of the input video stream based on pixel values of the current frame and one or more previous frames of the input video stream, and outputs the current frame if the motion has been detected therein;
   an object recognizer configured to receive and detect a moving object in the current frame using a machine learning algorithm;
   a display device configured to display the detected moving object; and
   an object tracking module configured to:
      simultaneously track a location of the detected moving object within corresponding frame, from latest co-ordinates of the detected moving object, while object recognition continues to recognize one or more of the detected moving objects;
      generate a tracking box and overlay the tracking box on the detected moving object and then transmit the video to the display device; and
      continue the tracking of the detected moving object till the object recognition continues for corresponding one or more of the detected moving objects.

7. The system of claim 6, wherein the motion detector is configured to provide only a moving region of the current frame for object detection when the motion has been detected in the current frame.

8. The system of claim 6, wherein the display device is configured to display the detected moving object in a corresponding bounding box.

9. The system of claim 6, wherein the motion detector is configured to
   compute a ratio of differing pixels based on difference in pixel values of the current frame and one or more previous frames; and
   detect the motion in the current frame, when the ratio is greater than a user-defined motion threshold.

10. The system of claim 6, wherein the object tracking module is further configured to simultaneously track the location of the detected moving object, when the object recognizer does not perform the detection of one or more moving objects in real-time.

11. The system as claimed in claim 6, wherein the camera is selected from at least one of: a remote, battery-powered surveillance camera, a home security camera with remote control via a home computer, a traffic camera, a home doorbell camera, a body camera, a camera on an unmanned aerial vehicle (UAV).

12. A surveillance camera system, comprising:
   a camera;
   a display device;
   a memory to store one or more instructions;
   a processor communicatively coupled to the camera, display, and the memory, wherein the processor is configured to execute the one or more instructions of the memory to:
      receive an input video stream from the camera;

detect if a motion has occurred in a current frame of the input video stream based on pixel values of the current frame and one or more previous frames of the input video stream;

provide the current frame for object detection if the motion has been detected therein;

detect a moving object in the current frame using a machine learning algorithm;

transmit the video to the display device for displaying the detected moving object;

simultaneously track the location of the detected moving object within corresponding frame, while object recognition continues to recognize one or more of the detected moving objects;

generate a tracking box and overlay the tracking box on the detected moving object and then transmit the video to the display; and continue the tracking of the detected moving object till the object recognition continues for corresponding one or more of the detected moving objects.

13. The surveillance camera system of claim 12, wherein the processor is further configured to execute the one or more instructions of the memory to provide only a moving region of the current frame for object detection when the motion has been detected in the current frame.

14. The surveillance camera system of claim 12, wherein the display device is configured to display the detected moving object in a corresponding bounding box.

15. The surveillance camera system of claim 12, wherein the processor is further configured to execute the one or more instructions of the memory to simultaneously track the location of the detected moving object, when the object recognizer does not perform the detection of one or more moving objects in real-time.

16. A computer programmable product stored on a non-transitory computer readable medium for performing real-time detection of objects in motion, the computer programmable product comprising a set of instructions, the set of instructions when executed by a processor causes the processor to:

receive an input video stream from a camera;

detect if a motion has occurred in a current frame of the input video stream based on pixel values of the current frame and one or more previous frames of the input video stream;

provide the current frame for object detection if the motion has been detected therein;

detect a moving object in the current frame using a machine learning algorithm;

transmit the video to the display device for displaying the detected moving object;

simultaneously track a location of the detected moving object within corresponding frame from latest co-ordinates of the detected moving object, while object recognition continues to recognize one or more of the detected moving objects;

generate a tracking box and overlay the tracking box on the detected moving object and then transmit the video to the display device; and continue the tracking of the detected moving object till the object recognition continues for corresponding one or more of the detected moving objects.

17. The computer programmable product of claim 16, wherein the set of instructions when executed by a processor causes the processor to provide only a moving region of the current frame for object detection when the motion has been detected in the current frame.

18. The computer programmable product of claim 16, wherein the set of instructions when executed by a processor causes the processor to display the detected moving object on the display device in a corresponding bounding box.

19. The computer programmable product of claim 16, wherein the detecting if the motion has occurred in the current frame, comprises using an advanced Convolutional Neural Network (CNN)-based optical flow detector as an input filter, wherein the CNN identifies features, such as corners, which are in common between the two or more frames, and determines which of these features have moved to detect motion.

20. The computer programmable product of claim 16, wherein the location of the detected moving object is simultaneously tracked within corresponding frame when the object detection of one or more moving objects does not happen in real-time.

* * * * *